Sept. 28, 1926.
P. W. BARCLAY
SYSTEM OF CONSERVING FRUITS
Filed Feb. 20, 1922
1,601,101
4 Sheets-Sheet 1
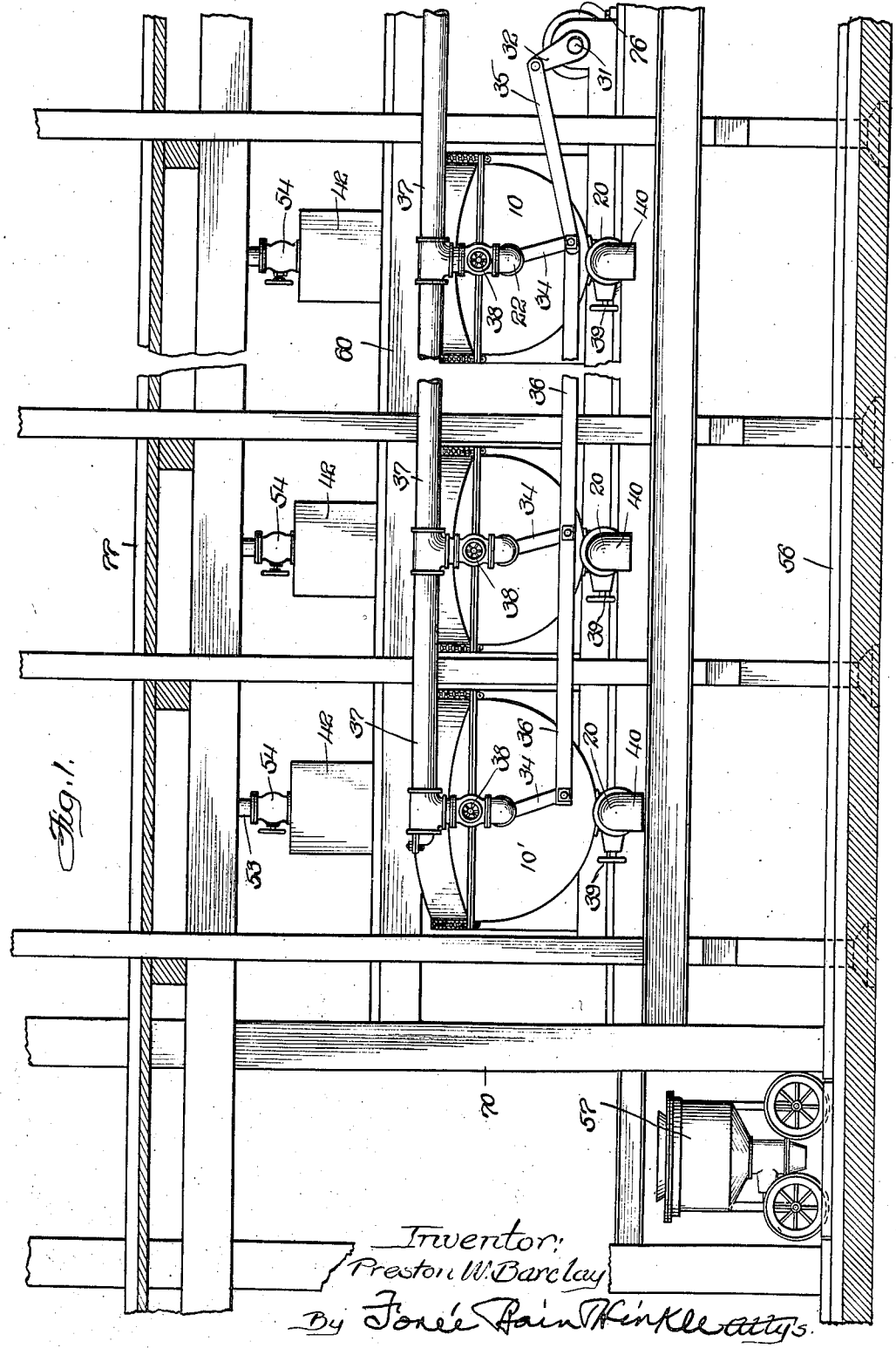

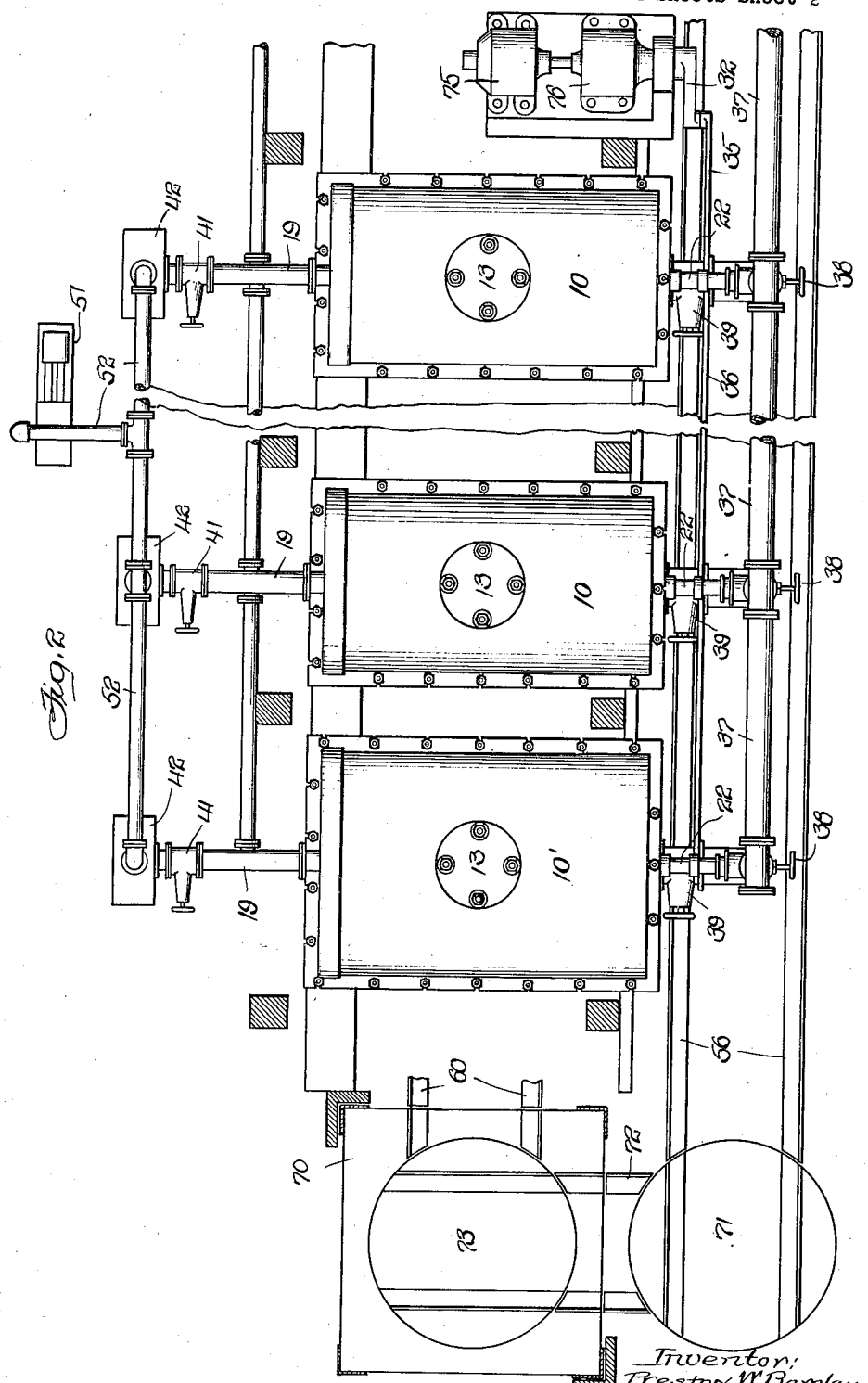

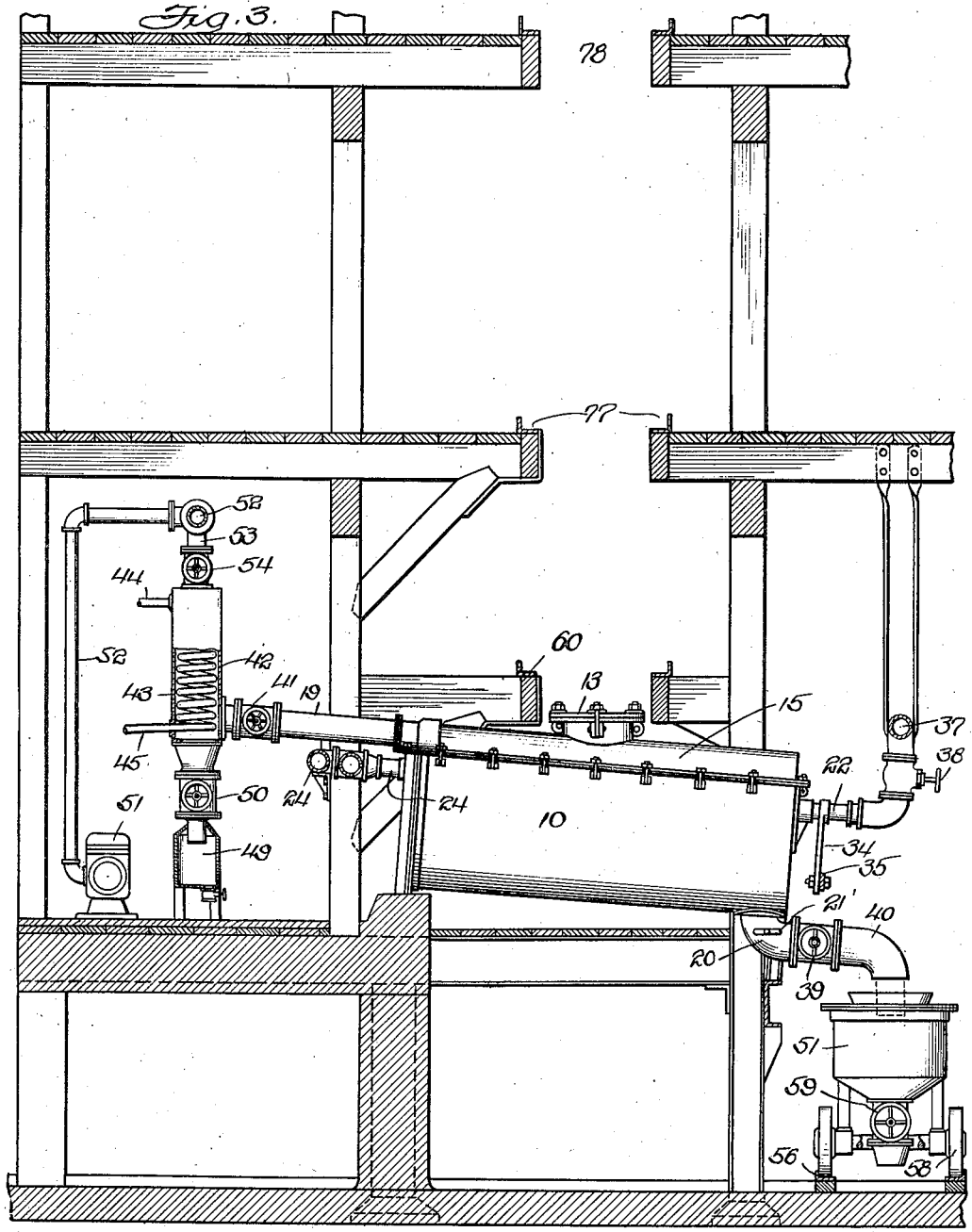

Sept. 28, 1926.
P. W. BARCLAY
1,601,101
SYSTEM OF CONSERVING FRUITS
Filed Feb. 20, 1922    4 Sheets-Sheet 4
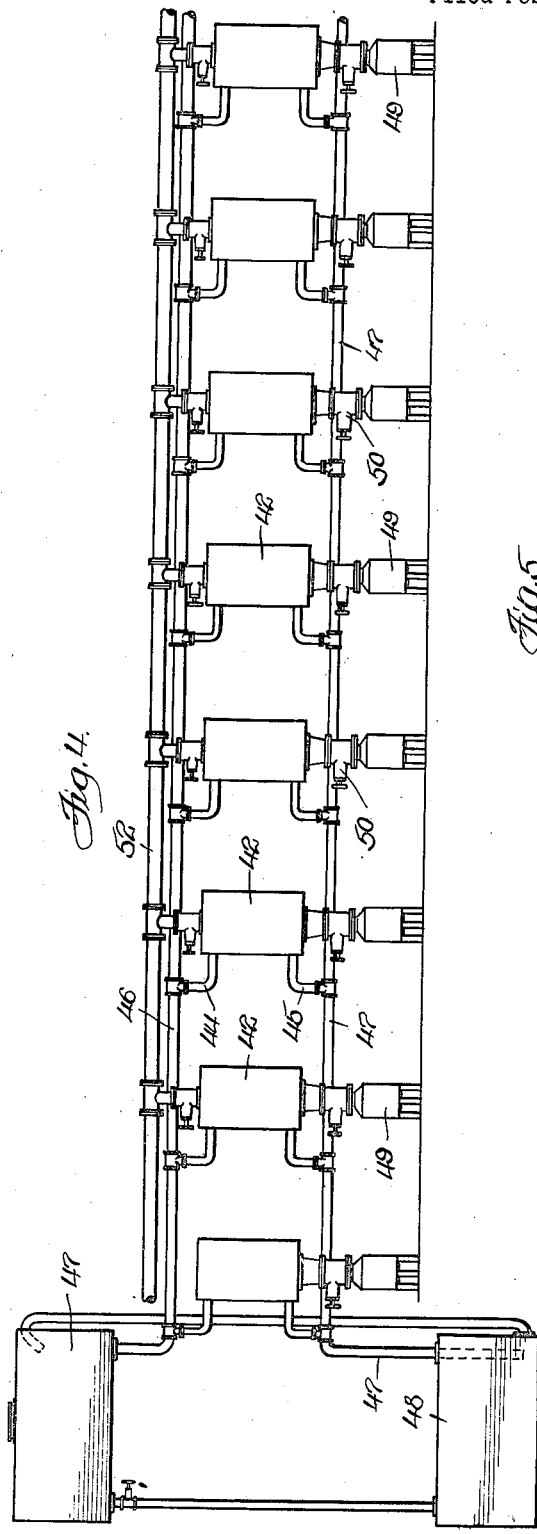
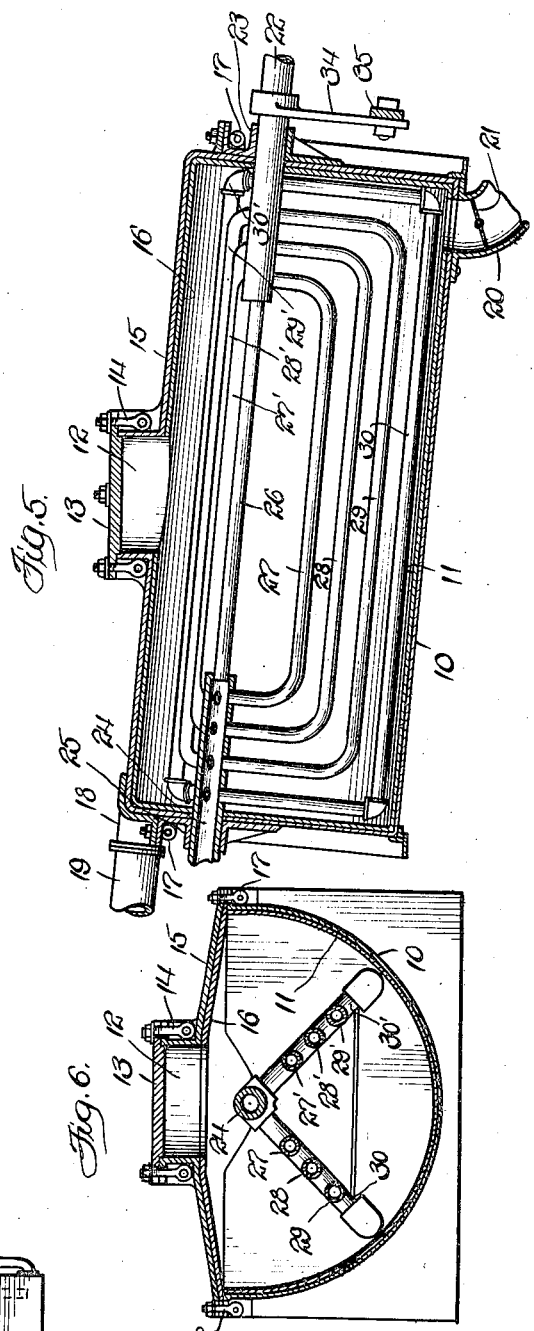
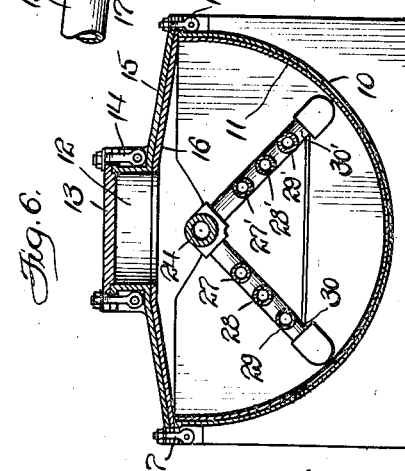
Inventor:
Preston W. Barclay Patented Sept. 28, 1926.

1,601,101

UNITED STATES PATENT OFFICE.

PRESTON W. BARCLAY, OF CHICAGO, ILLINOIS.

SYSTEM OF CONSERVING FRUITS.

Application filed February 20, 1922. Serial No. 537,836.

This invention relates to a method or process of and system for conserving fruits, vegetables, and the like.

One of the objects of the invention is the provision of a system, or arrangement of devices and the process, or mode of procedure by which fruits, vegetables, and the like, may be conserved or preserved and the essence or essential oils, characterizing the distinguishing flavors and qualities of the concomitant, reclaimed and subsequently reincorporated therewith, or otherwise utilized.

Another object is to provide an improved method and means for distributing the necessary heat throughout the mass, for cooking, and constantly agitating it to prevent compacting thereof and to hasten the cooking and vaporizing operations without heating the product to an undesirable temperature sufficient to scorch or burn the pulp and to crystallize the syrups.

Another object is to hasten the operation of cooking and vaporization by attenuating the atmospheric pressure in the cooking vessel so that the release of vapor will become effective at lower temperature, and whereby the vapor evolved may be conveyed therefrom and condensed and the distillate recovered.

Another object is, generally, to improve the construction of preserving plants of this character.

Other objects and advantages will hereinafter appear from a consideration of the following description when taken in conjunction with the drawings, wherein:—

Fig. 1 is an elevation of a plurality of cookers and evaporators interconnectible, and constituting a plant, by which my process may be carried into effect.

Fig. 2 is a plan view of the same showing condensers in the rear.

Fig. 3 is a transverse section of Fig. 2 showing parts of a condenser in section.

Fig. 4 is a side elevation of a plurality of condensers for each of which there may be a cooker, or evaporator.

Fig. 5 is an axial section of one of the cookers or evaporators.

Fig. 6 is a transverse section thereof.

In all the views the same reference characters are employed to indicate similar parts.

The system of arrangement and the method of procedure disclosed herein are admirably adapted to handle and process large quantities of fruit, vegetables, and the like, continuously, without interruption, thereby maintaining high economy in the utilization of the plant. Many varities of fruit or vegetables may be prepared at the same time without contamination of one by the other. The entire plant may, however, be employed in processing a single variety of fruit or vegetable at any one time with uniform results.

In the practice of the old method of preserving, in which the fruit was boiled with syrup in an open vessel, the fruit was overcooked in order to sufficiently cook the syrup and the ebullition of the mass liberated the essential oil or essence which gives flavor to the raw fruit and this escaping in form of vapor was lost and thus the conserve was robbed of a valuable constituent of its composition.

In carrying my invention into effect the evolved vapors, formerly constituting the essential essences of the raw fruit, are caught and condensed and subsequently reincorporated with the fruit pulp or otherwise utilized. Furthermore, I have preferred to use cane syrup before it is converted into sugar rather than to use the expensive process of converting it into sugar by evaporating the fluid contents and then reincorporating fluid with the sugar to produce a syrup.

The cooker, or evaporator, which I have preferred to use, consists of a closed covered tub 10 having, preferably, a lining 11, which is unaffected by acid or alkali, such as porcelain or the like. The tub has an intake opening 12 in its overlying cover, covered by a plate 13 which is held by pivoted bolts 14. This is a convenient manner of securing the closure over the opening 12, but any convenient means other than this may be employed.

The tub 10 is semi-cylindrical in cross-section, and is provided with a top or cover 15 which is also lined with a suitable material and secured to the tub by pivoted bolts 17, or otherwise, to render the tub substantially steam tight. The tub is slightly inclined in order to facilitate draining. Secured to the rear end of the top 15 is a flange 18 to be attached to vapor pipe 19, and at the opposite end of the tub and connected to the lower wall is a pipe outlet 20. The outlet 20 is provided with a perforated screen or butterfly valve 21 which is rotated for the purpose of discharging the pulp from the cooker when it is moved into one position in line with the axis of the pipe, and to serve as a strainer to permit exit of the syrup or liquid only when moved transversely of the axis of the pipe, as more clearly shown in Fig. 5.

Inside the tub 10 is an oscillatable, agitating heat supplying device or stirrer, by means of which the fruit is cooked. This stirrer consists of a pipe 22 oscillatable in a bearing 23 and another pipe 24, coaxially arranged with the pipe 22, and having a bearing at 25. These pipes are held together by a rod 26 and are interconnected by pipe loops 27, 28, 29 and 30. Located at substantially right angles to the loop pipes just described, and communicating with the pipes 22 and 24 is another similar loop structure having like pipes 27', 28', 29', and 30'. The pipes 27 to 30, inclusive, are for the purpose of containing a heating agent for the cooker to supply the necessary heat to cook the contents of the cooker 10. The heat-conveying structure is continuously and periodically oscillated thru an arc of about 90 degrees by rotating shaft 31 provided with a crank arm 32. The pipe 22 is oscillatable and is provided with an arm 34, secured thereto, which is connected to the crank arm 32 by means of a link 35, the outer end of which is pivoted to the end of the arm 34. Pivoted also to the arm 34 is a rod 36 which connects all of the arms 34 of the various cookers together. There may be in the series as many cookers as are required for the capacity of the plant. In many instances there are eight such cookers of which the cooker 10' has larger capacity for the reason hereinafter more specifically pointed out.

When the crank 32 is rotated the arms 34 of all of the cookers, together with the pipe structure or agitators of which there is one in each of the cookers, are oscillated substantially 90 degrees and these heat-carrying organizations, within each cooker, are constantly oscillated for the purpose of intermittently contacting all of the material within the cooker to prevent compacting of the pulp and for the purpose of more intimate contact therewith, and no other heat is required for cooking purposes. The heat or temperature may be graduated, by the pressure of the heating agent contained within the pipes 27 to 30, inclusive. The pipes 22 of all of the cookers are provided with suitable connections by which they may be oscillated and are thereby connected to a general heat distributing pipe 37. A valve 38 is connected between the pipes 22 and 37 so that the heating agent may be shut off from any cooker at any time. A valve 39 is connected to the end of the pipe 20 and to the valve is connected a discharge nozzle 40. The pipe 19, connected to the rear upper end of the cover 15 of the cooker, discharges into condenser 42 and a valve 41 controls this communication.

The vapors from the cooked fruit in the cooker 10 pass thru the pipe 19 into the condenser 42, where the hot vapors are brought into contact with the relatively cold coil 43. The terminal ends 44 and 45 of the coil are connected with water supply pipes, as more clearly shown in Fig. 4, and a reservoir 47 supplies the relatively cold water for the distributing pipe 46, and another reservoir 48 receives the water, relatively hot, from the receiving pipe 47. When the hot vapor from the cooked fruit enters the condenser the vapor is condensed into a liquid which passes into receptacle 49 thru a controlling valve 50.

An air and vapor pump 51 is connected to the upper end of the condensers by a pipe 52. All of the condensers are connected in common to this pipe. The pump 51 draws the air and vapor from each of the cookers and produces attenuation therein tending to establishing a vacuum, and the vapor drawn from the cooker, when it passes thru the condenser is converted into a liquid. Condensation of the vapor causes the separation between the vapor and the air, the vapor being reduced to liquid form is recovered in the container 49. There is no mixture of vapors extracted from the various cookers and, inasmuch as each cooker is provided with a separate condenser, the recovered essence from the particular substance in the cooker is unaffected by the character of the essence that may be caught in the container 49 of another cooker and condenser.

A railway track 56 is provided under the nozzles 40 of each of the series of cookers for a syrup car 57, which is mounted on wheels 58 and which is provided with a discharge valve 59. Another railway track 60 is provided parallel with the railway track 56 and located above the cookers, as more clearly shown in Fig. 3. An elevator 70 is provided at one end of the railway track 60 for the purpose of lifting the syrup car 57 from the track 56 to the track 60. By this arrangement, a syrup car may be passed from the track 56 to a turntable 71, and from thence to a transfer track 72 onto the elevator 70. The elevator 70 may also have a turntable 73 so that when the car arrives at a level with the track 60, the turntable 73 may be rotated and the car thus taken from the track 56 to the track 60. By this means fruit or pulp or other contents of a cooker 10 may be taken from one cooker and transferred to another, or the syrup from one cooker may be thus taken from its pulp and carried to another cooker, and after it has been sufficiently cooked without the pulp, which is a great advantage in the production of a desirable quality of the conserve, the syrup may then again be taken from the cooker and returned to the pulp. The larger cooker 10' may be used to recook the syrup from a plurality of smaller cookers.

An electric motor 75 may be used for agitating the contents of the cooker by the stirrer and a speed reducing gearing structure 76 may be connected to the motor and to the crank 32 for reducing the speed of the motor as applied to the crank.

Other railway tracks 77 and 78 may be provided in the plant to which the car 57 may be taken in the manner described. When a car is on the track 77 the cane syrup that is necessary to be incorporated with the fruit may be carried to the proper point on this railway track and deposited in the respective cookers by means of a suitable conduit like that which depends from the car, or the track 60 may be used for this purpose when necessary without additional means.

Hot water is used in the cookers 10 as a heat supplying medium. I prefer, however, to use steam in the larger cooker 10' in which only syrup, taken from the fruit pulp, is concentrated, as this may be accomplished at a higher temperature.

The plant herein described, consisting of the arrangement of devices, is very flexible in its use in which the products may be handled in a most economical manner for the purpose of making a fruit conserve, preserve, jam, marmalade, fruitbutter, and the preservation of vegetables, and the like, and when vegetables are processed for the purpose of preserving them the vaporized portion which gives flavor and character to the vegetables may be preserved and reincorporated with the same as when the fruit is used, thereby providing a most excellent product and one that is highly appreciated and is obtained without excessive cost in its production.

The proportions of the ingredients will depend somewhat upon the character of fruit and the strength of the syrup may be 21 degrees Baumé for preserving, 38 degrees Baumé when prepared for use at soda fountains and 42 degrees Baumé when used for making certain kinds of confections. The degree of exhaust may be one to two pounds, and the time of cooking depends to some extent upon the product to be produced, largely an item of skill.

The reason for withdrawing the syrup from the fruit is that the surup may be further concentrated without overcooking the fruit, thereby preserving the essential oils and retaining the flavor of the fruit.

While I have herein shown a single embodiment of my invention for the purpose of clear disclosure, it will be manifest to persons skilled in the art, that many changes may be made in the general arrangement and configuration of the parts within the scope of the appended claims.

Having described my invention what I claim as new and desire to secure by Letters Patent, is:—

1. The method of preserving fruit and the like which consists in cooking it in syrup in a closed vessel; reducing pressure in said vessel below atmosphere, to lower the boiling point temperature, by drawing off and condensing the vapor and drawing of the air; subsequently drawing off the syrup; continuing cooking the syrup separately to concentrate it without overcooking the fruit, then returning the syrup and condensed vapor to the cooked pulp.

2. The method of preserving fruit, vegetables, and the like, which consists in cooking it in a closed vessel; reducing the pressure in said vessel below atmospheric pressure to lower the boiling point by drawing off the air and vapor; condensing the vapor; drawing off the liquid from the pulp; mixing said condensed vapor and said liquid continuing the cooking of the liquid and condensed vapor under sub-atmospheric pressure to concentrate the mixture and then returning said liquid and the liquid of condensation to said pulp.

3. The method of preserving fruit, vegetables, and the like, which consists in cooking it in a closed vessel; continuously stirring or agitating the mass to facilitate ebullition thereof; reducing pressure in said vessel below atmospheric pressure to lower the boiling point by drawing off the vapor; condensing the vapor; drawing off the liquid; continuing the cooking of the liquid under sub-atmospheric pressure to reduce the water content, without overcooking the pulp, then returning said liquid and the liquid of condensation to the pulp.

4. The method of preserving fruit and the like which consists in submerging a body of raw fruit in cane syrup; maintaining the mixture at normal temperature until the juices are partly extracted from the fruit; placing the fruit and syrup in a closed vessel; cooking the fruit by constantly moving a suitably heated stirrer therein; reducing the atmospheric pressure in the cooker during the cooking operation, to lower the boiling point and to draw off the vapor therefrom; condensing the vapor; continuing the cooking operation of the syrup under sub-atmospheric pressure; condensing the vapor thereof and returning the reduced syrup and distillates to the fruit.

In testimony whereof I hereunto subscribe my name.

PRESTON W. BARCLAY.